United States Patent
Meunier et al.

(10) Patent No.: US 12,095,804 B2
(45) Date of Patent: Sep. 17, 2024

(54) SYSTEMS AND METHODS FOR BOT MITIGATION

(71) Applicant: Shopify Inc., Ottawa (CA)

(72) Inventors: Devon Meunier, Guelph (CA); Osama Sidat, Kitchener (CA); John Jong-Suk Lee, Waterloo (CA); Dennis Ho, Rockcliffe (CA)

(73) Assignee: Shopify Inc., Ottawa (CA)

(*) Notice: Subject to any disclaimer, the term of this patent is extended or adjusted under 35 U.S.C. 154(b) by 302 days.

(21) Appl. No.: 17/341,700

(22) Filed: Jun. 8, 2021

(65) Prior Publication Data

US 2022/0394058 A1    Dec. 8, 2022

(51) Int. Cl.
*H04L 9/40* (2022.01)
(52) U.S. Cl.
CPC ................. *H04L 63/1441* (2013.01)
(58) Field of Classification Search
CPC ........... H04L 63/1416; H04L 63/1425; H04L 63/1441; H04L 63/1408; H04L 63/145; H04L 63/1466; H04L 2463/144; G06F 21/56; G06F 21/55
See application file for complete search history.

(56) References Cited

U.S. PATENT DOCUMENTS

| | | | | |
|---|---|---|---|---|
| 8,838,570 B1* | 9/2014 | English | .............. | H04L 63/1408 |
| | | | | 707/709 |
| 9,942,214 B1* | 4/2018 | Burciu | .............. | H04L 63/08 |
| 10,122,748 B1* | 11/2018 | Currie | ................ | H04L 63/1433 |
| 2012/0096549 A1* | 4/2012 | Amini | ................ | H04L 63/1433 |
| | | | | 726/23 |
| 2013/0054433 A1* | 2/2013 | Giard | ................ | H04L 63/08 |
| | | | | 709/224 |
| 2014/0250538 A1* | 9/2014 | Rapaport | ........... | G06F 21/31 |
| | | | | 726/28 |
| 2016/0044054 A1* | 2/2016 | Stiansen | ............. | H04L 63/1416 |
| | | | | 726/24 |
| 2017/0374094 A1* | 12/2017 | Agarmore | ........... | H04L 63/1441 |
| 2018/0005315 A1* | 1/2018 | Rines | ................ | G06Q 40/02 |
| 2018/0349599 A1* | 12/2018 | Teller | ................ | H04L 67/02 |
| 2020/0201988 A1* | 6/2020 | Park | ................ | G06F 21/64 |
| 2020/0412751 A1* | 12/2020 | Thayer | ............... | G06F 21/566 |
| 2021/0194903 A1* | 6/2021 | Medvedovsky | .... | H04L 63/1416 |
| 2021/0243205 A1* | 8/2021 | Peron | ................ | H04L 63/0876 |
| 2021/0266345 A1* | 8/2021 | Chen | ................ | H04L 63/1425 |
| 2021/0334369 A1* | 10/2021 | Keiter | ............... | G06F 21/31 |

* cited by examiner

*Primary Examiner* — Ali S Abyaneh
(74) *Attorney, Agent, or Firm* — Rowand LLP

(57) ABSTRACT

Methods and systems for using a distributed ledger to record bot mitigation test results and enable servers to determine a bot mitigation score for a remote device based on previously recorded test results associated with the remote device. The server may detect a trigger for bot mitigation in association with a remote device, obtain identifying data regarding the remote device and search a distributed ledger using the identifying data to locate one or more test results stored in records on the distributed ledger containing the identifying data. It may then determine a bot likelihood score based on the one or more test results, compare the bot likelihood score to a threshold and, in response to the comparison, execute a mitigation action.

21 Claims, 8 Drawing Sheets

FIG. 8

SYSTEMS AND METHODS FOR BOT MITIGATION

TECHNICAL FIELD

The present disclosure relates to computer security and, more particularly, to online bot mitigation systems and methods.

BACKGROUND

Users of the internet will be familiar with bot testing in the form of CAPTCHA (Completely Automated Public Turing test to tell Computers and Humans Apart) tests. Many online services and resources employ some form of bot mitigation testing to identify and take action against bot activity.

Bot mitigation can be disruptive to online service and can delay user activity while bot mitigation testing occurs and is evaluated. There are many online services that provide bot mitigation services to web servers and other servers, such as the reCAPTCHA service from Google™. However, these tests may be proprietary, opaque in nature, and may not provide the server with control over the difficulty or selectivity of the testing. Moreover, in many cases a web server or application server may utilize a plurality of other online services in providing a service or resource to a remote device and each of those other online services may apply bot mitigation processes, resulting in a duplication of bot mitigation testing.

BRIEF DESCRIPTION OF THE DRAWINGS

Embodiments will be described, by way of example only, with reference to the accompanying figures wherein:

FIG. 8 is an example of a home page of an administrator, according to an example embodiment.

DETAILED DESCRIPTION

Figure 1:
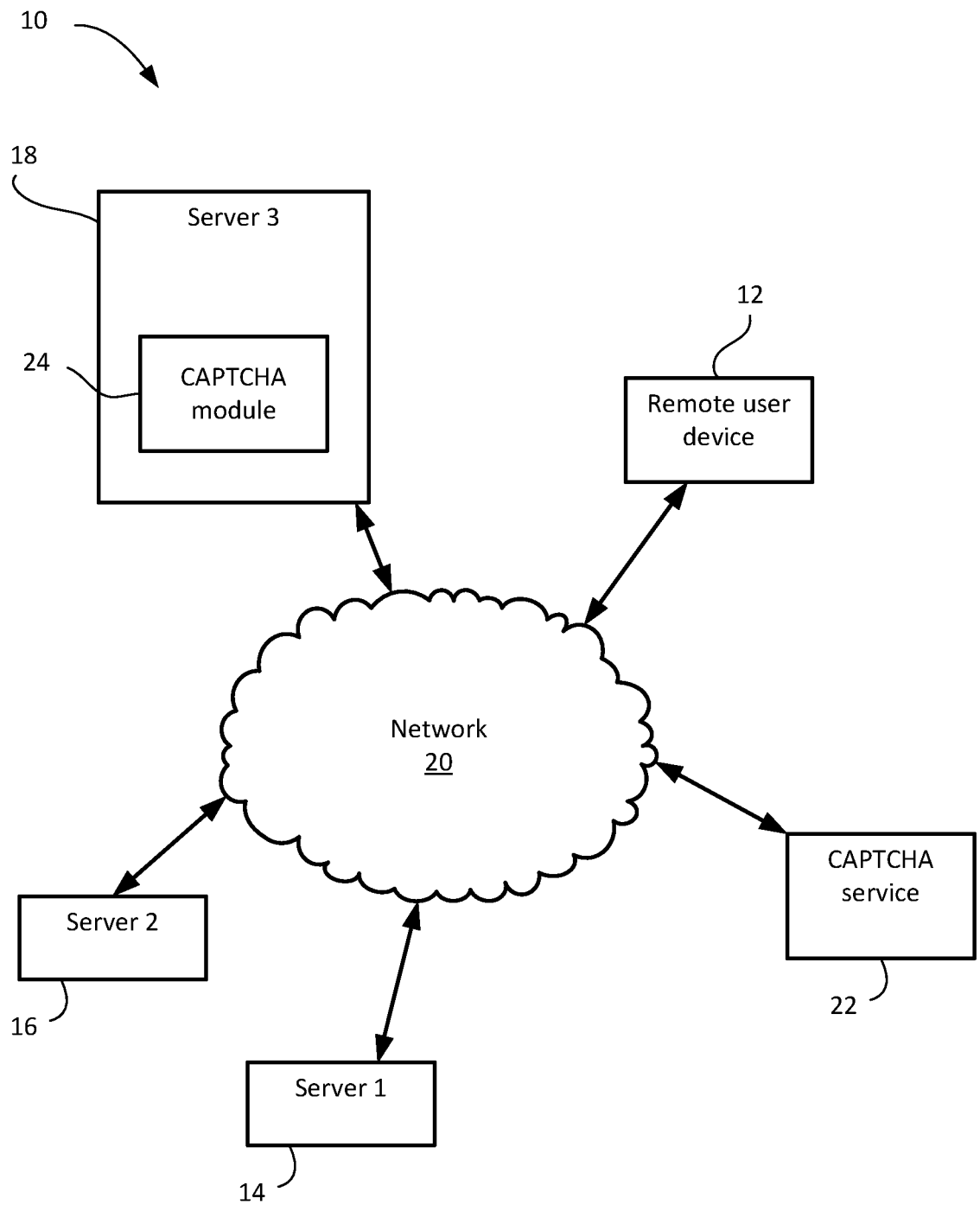
FIG. 1 shows an example system for bot mitigation.

In an aspect, the present application discloses a computer-implemented method. The method may include detecting a trigger for bot mitigation in association with a remote device; obtaining identifying data regarding the remote device; searching a distributed ledger using the identifying data to locate one or more test results stored in records on the distributed ledger containing the identifying data; determining a bot likelihood score based on the one or more test results; and comparing the bot likelihood score to a threshold and, in response to the comparison, executing a mitigation action.

In some implementations, the test results are associated with respective times of test and determining the bot probability score may include filtering or weighting the test results based on the respective times of test.

In some implementations, the test results are associated with respective test types, and determining the bot probability score may be at least partly based on the respective test types.

In some implementations, the mitigation action includes executing a bot mitigation test.

In some implementations, the identifying data includes one or more of a user identifier, an account identifier, or a device identifier.

In some implementations, the detecting the trigger includes detecting a user input from the remote device in connection with a webpage element.

In some implementations, the public ledger includes a blockchain and obtaining may include searching the blockchain for transactions containing the identifying data.

In some implementations, the trigger includes receiving a request for access to a flash sale. In some cases, the mitigation action includes allocating the remote device to a secondary tier in a queue for the flash sale. In some cases, the mitigation action includes blocking the remote device from the flash sale. In some cases, wherein the mitigation action includes allocating the remote device a position in a queue based on its bot mitigation score relative to bot mitigation scores of other devices in the queue.

In another aspect, the present application discloses a computing system. The computing system includes a processor and a memory storing computer-executable instructions that, when executed, are to cause the processor to detect a trigger for bot mitigation in association with a remote device; obtain identifying data regarding the remote device; search a distributed ledger using the identifying data to locate one or more test results stored in records on the distributed ledger containing the identifying data; determine a bot likelihood score based on the one or more test results; and compare the bot likelihood score to a threshold and, in response to the comparison, execute a mitigation action.

In yet another aspect, the present application discloses a non-transitory, computer-readable medium storing computer-executable instructions that, when executed by a processor, are to cause the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

The term "bot" refers to a computer-implemented automated process that attempts to gain access to or use an online resource or service. The bot may access an online resource or service, such as a website or other hosted resource, by way of a session, such as a browsing session. The bot may appear to the online resource or service as a legitimate user accessing the server hosting the online resource or service using a web browser, dedicated application, or other software tool intended to facilitate user access to the server. Bots may be employed for nefarious purposes in some cases. For instance, they may be used in a denial of service (DOS) attack by flooding a server with requests and sessions. In some cases, they may be used to gain mass early access to a resource or service, such as during a flash sale, ticket sale, booking window, etc. The online resource may be limited in quantity, time slots, availability, etc., and bots may be able to swamp the online resource faster and more efficiently than live users, thereby preventing live users from equal opportunity access to the online resource.

For this and other reasons, many online resources or services implement bot testing and mitigation processes. A bot testing process is a process to evaluate whether a session is being conducted by a bot or by a live user. The testing process may produce test results that indicate whether the remote device is a bot or not a bot, or may indicate a likelihood of the remote device being a bot. Mitigation actions may be taken based on the test results. Mitigation actions may include blocking or ending the session, imposing a further bot testing process, or other such actions.

Users of the internet will be familiar with bot testing in the form of CAPTCHA (Completely Automated Public Turing test to tell Computers and Humans Apart) tests. A common form is the display on a website of a set of alphanumeric characters that have been warped or obscured such that they are readable by humans but unreadable by machines. Other CAPTCHAs may include identifying which images in a grid of images contain a specified feature or item.

Google™ has become a very common source for websites to obtain CAPTCHA protection. The website code builds in an API call to a Google™ CAPTCHA service that supplies the CAPTCHA test and returns a "yes/no" result to the website server.

AI advances have made traditional CAPTCHA puzzles easier for automated systems to defeat, and website designers are more sensitive to the user annoyance factor of interrupting website usage to verify a user is authentic. Partly in response, Google™ has transitioned to "reCAPT-CHA", which is an iteration of their CAPTCHA service that tries to assess the likelihood that a remote device is a "bot" based on a number of factors/signals of website interaction before determining whether to present an actual CAPTCHA test. If a remote device is deemed low risk based on the interactions with the website during its session, no visible CAPTCHA test may be presented. Alternatively, a simple "I am not a robot" checkbox may be displayed. The signals considered in bot assessment are proprietary to Google™, but are suspected to include cookies on the user device, other device-identifying data, mouse or other user interface activity, etc.

Although the reCAPTCHA service may be commonly used, and in some cases may be used as an "invisible" CAPTCHA, some online service or resource owners or operators want greater control over the degree of bot-sensitivity. Those services or resources may have their own CAPTCHA test, or may require a stricter bot test in certain contexts. Moreover, those services or resources may be reluctant to rely solely on proprietary bot testing from Google™ through exposing their website activity to Google's platform and receiving back a bare assessment of bot likelihood.

Another drawback of the current model is that some systems, such as an e-commerce platform for example, may employ multiple web services provided or controlled by different entities, all of which may implement some level of bot mitigation. This can lead to imposition of a series of bot mitigation tests, including CAPTCHA tests, for the same session with the same remote device. While in some cases a CAPTCHA execution may result in storage of a token at the remote device that can be authenticated by a subsequent CAPTCHA execution, the tokens typically have a short lifespan, e.g. two minutes, and the subsequent test still relies on trusting the earlier CAPTCHA execution without control over its complexity or resiliency to compromise.

FIG. 1 shows an example system 10 that includes a user device 12, a first server 14, a second server 16, and a third server 18. The user device 12 and the servers 14, 16, 18 are configured to communicate over a computer network 20, such as the Internet. The user device 12 in this example may be used to request access to a resource or service at the first server 14. The first server 14 may include a web server for serving webpages to the user device 12 and receiving and processing requests from the user device 12, such as page navigation requests, data input into forms, uploaded files, download requests, etc. The first server 14 may use various services or applications provided by the second server 16 and the third server 18.

The first server 14 may employ a bot mitigation process, such as a CAPTCHA service 22 provided by an external source. The first server 14 may include one or more webpages, or links or other actionable portion of webpages, that when selected execute an API call to the CAPTCHA service 22. The CAPTCHA service 22 may obtain data from the first server 14 and/or from the user device 12. The data may include any test data relevant to the bot mitigation test applied by the CAPTCHA services, such as input data from the user device 12 in reply to a CAPTCHA test transmitted to and displayed on the user device 12, or data regarding interactions of the user device 12 during its session with the first server 14. The CAPTCHA service 22 may send test results to the first server 14. The test results may, in some cases, indicate whether the user device is suspected to be a bot or not a bot.

The second server 16 may provide a service or resource used by the first server 14. The resource provided by the second server 16 may be incorporated into the services/resources provided by the first server 14, such that when the user device 12 submits a particular request to the first server 14, such as clicking a particular link or button on a webpage, the first server 14 executes a call to the second server 16. The second server 16 then provides its service to the user device 12 through the webpages of the first server 14. In some cases this may involve user interaction with the services of the second server 16.

In order to protect its services, the second server 16 may employ bot mitigation. This may be implemented at the second server 16 through an API call to an external bot mitigation service, such as the CAPTCHA service 22, although it may be a different service from the one used by the first server 14 in some implementations. In some cases, the user device 12 may have a token or other stored data associated with test results from the CAPTCHA service 22 employed by the first server 14. In some cases, the second server 16 and/or the CAPTCHA server 22 may rely on those test results in connection with access to the second server; but in other cases, the CAPTCHA service 22 may execute a further bot mitigation test vis-à-vis the user device 12.

The third server 18 may also provide a service or resource used by the first server 14. The resource provided by the third server 18 may be incorporated into the services/resources provided by the first server 14, such that when the user device 12 submits a particular request to the first server 14, such as clicking a particular link or button on a webpage, the first server 14 executes a call to the third server 18. The third server 18 then provides its service to the user device 12 through the webpages of the first server 14. In some cases this may involve user interaction with the services of the third server 18.

In order to protect its services, the third server 18 may take action to mitigate against bots. This may be provided at the third server 18 through a custom CAPTCHA module 24 or service implemented by the third server 18. The CAPTCHA module 24 may apply a bot test, which may or may not involve user interaction with the user device 12, e.g. the display of a test on the user device 12 and the receipt and evaluation by the CAPTCHA module 24 of input data from the user device 12 in reply to the test.

It will be appreciated that in this example a user operating the user device 12 may, in some implementations, be required to complete bot mitigation testing on three occasions during a session with the webpages of the first server 14.

Accordingly, in one aspect the present application provides a method and system for engaging in bot mitigation in a manner that allows one service to obtain bot mitigation test results and details from one or more other services. To facilitate the publishing and exchange of bot mitigation test results, a public or private ledger may be used to record bot mitigation test results, which may include, for example, identifying information for the user/device (e.g., username, account identifier, device identifier, etc.), time of test, nature of test (e.g., type and/or quantitative measure of complexity), the entity/service that conducted the test, and the result (e.g., yes/no and/or a score or probability). The ledger may be a blockchain in some implementations.

In some implementations, a server that executes a bot mitigation process during a browsing session associated with a remote device may first search the ledger based on user and/or device identifying details to locate one or more previous tests. The server may then determine a score or rating for the remote device's bot likelihood based on the time of those test results, the nature of the tests, and the entity conducting the test, alone or together, or in combination with other test details. The server may then determine on the basis of the score or rating whether to execute a further bot mitigation test or to rely on the rating or score based on the test results from the ledger.

Figure 2:
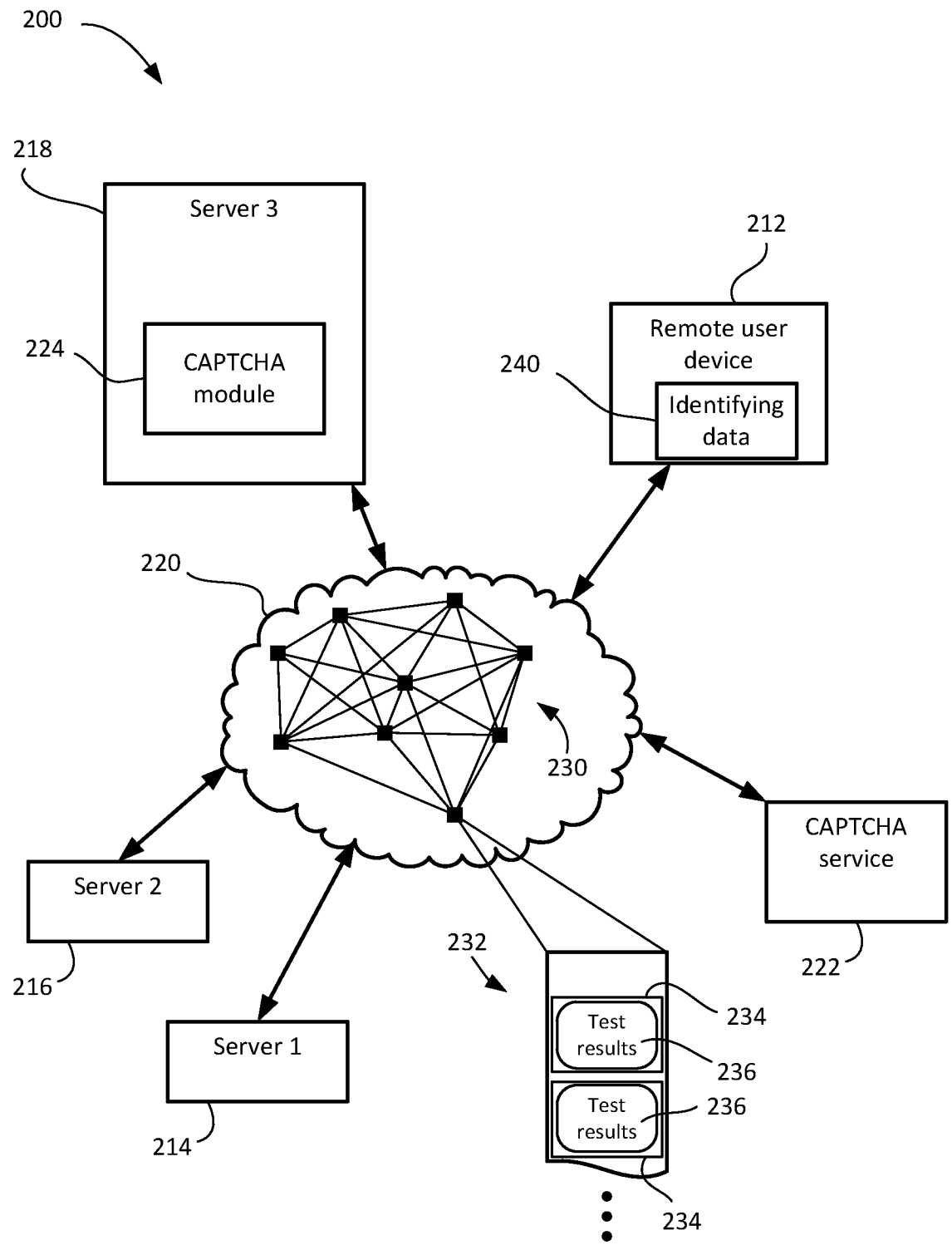
FIG. 2 shows another example system for bot mitigation that uses a distributed ledger storing test results.

FIG. 2 diagrammatically illustrates one example system 200 for bot mitigation. The system 200 includes a user device 212, a first server 214, a second server 216, and a third server 218. The user device 212 and the servers 214, 216, 218 are configured to communicate over a computer network 220, such as the Internet. The user device 212 in this example may be used to request access to a resource or service at the first server 214. The first server 214 may include a web server for serving webpages to the user device 212 and receiving and processing requests from the user device 212, such as page navigation requests, data input into forms, uploaded files, download requests, etc. The first server 214 may use various services or applications provided by the second server 216 and the third server 218.

The first server 214 may employ a bot mitigation process, such as a CAPTCHA service 222 provided by an external source. The first server 214 may include one or more webpages, or links or other actionable portion of webpages, that when selected execute an API call to the CAPTCHA service 222. The CAPTCHA service 222 may obtain data from the first server 214 and/or from the user device 212. The data may include any test data relevant to the bot mitigation test applied by the CAPTCHA services, such as input data from the user device 212 in reply to a CAPTCHA test transmitted to and displayed on the user device 212, or data regarding interactions of the user device 212 during its session with the first server 214. The CAPTCHA service 222 may send test results to the first server 214. The test results may, in some cases, indicate whether the user device is suspected to be a bot or not a bot.

The second server 216 and the third server 218 may also employ bot mitigation processes. In this example, the second server 216 may rely on an external bot mitigation service, such as the CAPTCHA service 222. The third server 218 may have its own bot mitigation service, shown in this example as CAPTCHA module 224.

In this example, the network 220 includes a distributed ledger network 230. The distributed ledger network 230 includes a plurality of nodes, e.g. computing devices, interconnected and exchanging data regarding a distributed ledger 232. The distributed ledger 232 includes, among other data, recorded data regarding bot mitigation testing. In particular, the distributed ledger 232 includes one or more records 234 and the one or more records store test results 236. In some cases, the distributed ledger network 230 is a blockchain network and the distributed ledger 232 is a blockchain. The records 234 may include blockchain transactions included in the blockchain and containing one or more data fields within which the test results 236 are recorded.

The user device 212 may include identifying data 240. The identifying data 240 may include data identifying the user device 212 and/or data identifying a user or user account. For instance, the identifying data 240 may include a MAC address, international mobile subscriber identity (IMSI), international mobile equipment identity (IMEI), mobile station ISDN (MSISDN), a token or cookie stored on the user device 212, or a device fingerprint. The device fingerprint may be a hash of a selected portion of memory on the device, or a hash of one or more other device identifying data items. The identifying data 240 may include a user identifier, such as a name, email address, social media handle, or the like. The identifying data 240 may include a plurality of identifiers.

The records 234 stored on the distributed ledger 232 include identifying data stored in association with the test results 236. That is, each test result 236 has associated identifying data so that the test result 236 is attributable to an identifiable user device. The test results 236 include the result of a bot mitigation process carried out in connection with the user device. Data stored as test results 236 may include the identifying data for the user device, type data regarding the type of bot mitigation test applied, tester data identifying the entity that conducted the bot mitigation test, a timestamp indicated the time/date at which the test occurred, and results data indicating the result of the test. Depending on the nature and type of bot mitigation test, the results data may include a binary "bot"/"not bot" indicator or may include more detailed data, such as a score or probability measure indicating a likelihood of the user device being a bot.

Accordingly, when a server, such as the first server 214, the second server 216, or the third server 218, conducts bot mitigation with regard to the user device 212, it first obtains the identifying data 240 and searches the distributed ledger 232 to locate one or more records that contain the identifying data 240. Those records reflect previous bot mitigation test results with regard to the user device 212. In this manner, the server may determine from the previous test results whether the user device 212 is unlikely to be a bot, or whether further bot mitigation testing should be applied. If it determines from the retrieved test results that the user device 212 is likely a bot, then it may carry out a bot mitigation action, which might include further bot mitigation testing and/or blocking the user device 212 from accessing a resource or service.

If the server carries out a further bot mitigation test, for example using its own CAPTCHA service or an external CAPTCHA service, the server then records the results of that further bot mitigation test on the distributed ledger 232. In particular, it generates a record containing the test results, such as the test results, the type of test, time of test, the identifying data 240, an identifier for the server, and/or an identifier for the external service conducting the test. The record is recorded on the distributed ledger 232 by the server or by one of the nodes making up the distributed ledger network 230.

Figure 3:
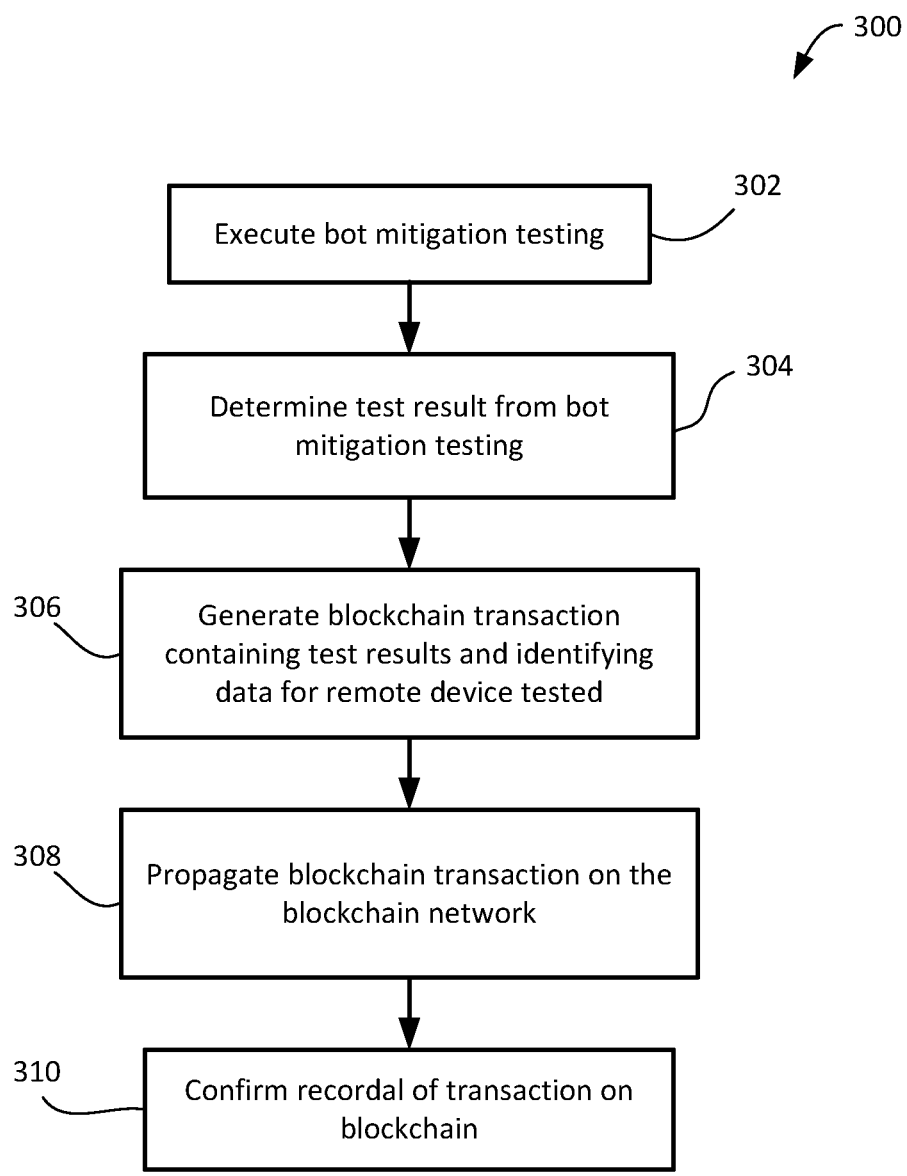
FIG. 3 shows, in flowchart form, an example method for recording bot mitigation test results on a distributed ledger.

Reference will now be made to FIG. 3, which shows, in flowchart form, an example method 300 for conducting bot mitigation. The method 300 may be carried out by a computing device and, in particular, a server that provides access to a service or resource accessible to remote user devices. The server may implement the method 300 as a part of its processes for reducing non-human-user load on the server, i.e. for identifying likely bots and taking mitigation actions. The server may include, for instance, a web server. In some cases, the server provides a bot mitigation service to other servers, such as web servers, that request bot mitigation processes from the server.

The method 300 may include executing a bot mitigation test in operation 302. The bot mitigation test may include receiving data regarding input at the remote user device. The data regarding input may include active display of a bot mitigation test, such as a CAPTCHA puzzle, and receiving an input answer. The data regarding input may include mouse or touchscreen activity data. The mouse or touchscreen activity data may be in relation to an active display of a bot mitigation test, such as a checkbox test, or may be unconnected to a displayed bot mitigation test. In some cases, the bot mitigation test may include other data regarding activity at the remote user device, such as stored tokens or cookies, browsing history data, session history data, or other data relevant to the applicable bot mitigation test.

Operation 302 may further include receiving identifying information regarding the remote user device and/or the remote user. As discussed above, the identifying information may include, as examples, a MAC address, IMSI, IMEI, MSISDN, a token or cookie stored on the remote user device, or a device fingerprint. Other examples include a username, email address, social media handle, or the like. The identifying information may include a plurality of identifiers.

In operation 304, the server determines a test result based on the received information. The test result may, in some cases, be a binary determination of whether the remote user device is a bot or is not a bot. In some other cases, the test result may be a non-binary score or rating of bot likelihood or probability. The server may take some action in connection with the determination of the test result, such as granting or blocking access to a service or resource. In the case where the server is providing a bot mitigation testing service to an external server, the action may include sending the test results to the external server.

The server then, in operation 306, generates a ledger entry for recordal of the test results on a distributed ledger. In this example, the distributed ledger may be a blockchain and the ledge entry may be a blockchain transaction. The blockchain transaction is structured to include the test results in a data field in the transaction. The data field or a further data field may include some or all of the identifying information regarding the remote user device. The blockchain transaction may further include an identifier for the server, such as a public key or other unique code identifying the server or, if the server is one of a group of servers providing the bot mitigation service, then the identifier may identify the group of servers or entity that implements the group of servers, e.g. the identifier may identify a commercial entity that provide online resources using a large collection of servers.

The blockchain transaction may also include a timestamp. The timestamp may indicate the time and date at which the bot mitigation testing occurred. In some cases, a timestamp may not be included in the data within the transaction on the basis that the blockchain transaction itself may include a timestamp reflecting its time of creation, propagation, validation, or confirmation.

The blockchain transaction may include, within a data field in the transaction, data regarding the bot mitigation test applied. In some cases, the data may indicate a type or class of test, e.g. active or hidden test, image identification test, scrambled letters test, etc. A predefined set of codes may be defined for indicating particular types or classes of tests. In some cases, the data may indicate a test difficulty, i.e. a score or rating indicating the complexity or accuracy of the test.

In operation 308, the server propagates the ledger entry, e.g. the blockchain transaction, on the blockchain network. This may include transmitting the blockchain transaction to one or more blockchain nodes on the blockchain network. In some cases, the server may itself serve as one of the blockchain nodes connected to the blockchain network. In some cases, the server may implement a simplified wallet function that enables it to generate and send blockchain transactions. The implementation may vary depending on the blockchain protocol being used.

The server may optionally confirm recordal of the transaction on the blockchain in operation 310. Depending on the blockchain protocol, the server may receive a notification confirming that the blockchain transaction has been recorded in a block on the blockchain. In some cases, the server may periodically search or query the blockchain to determine whether the propagated transaction has been confirmed and included in the latest block on the blockchain.

Figure 4:
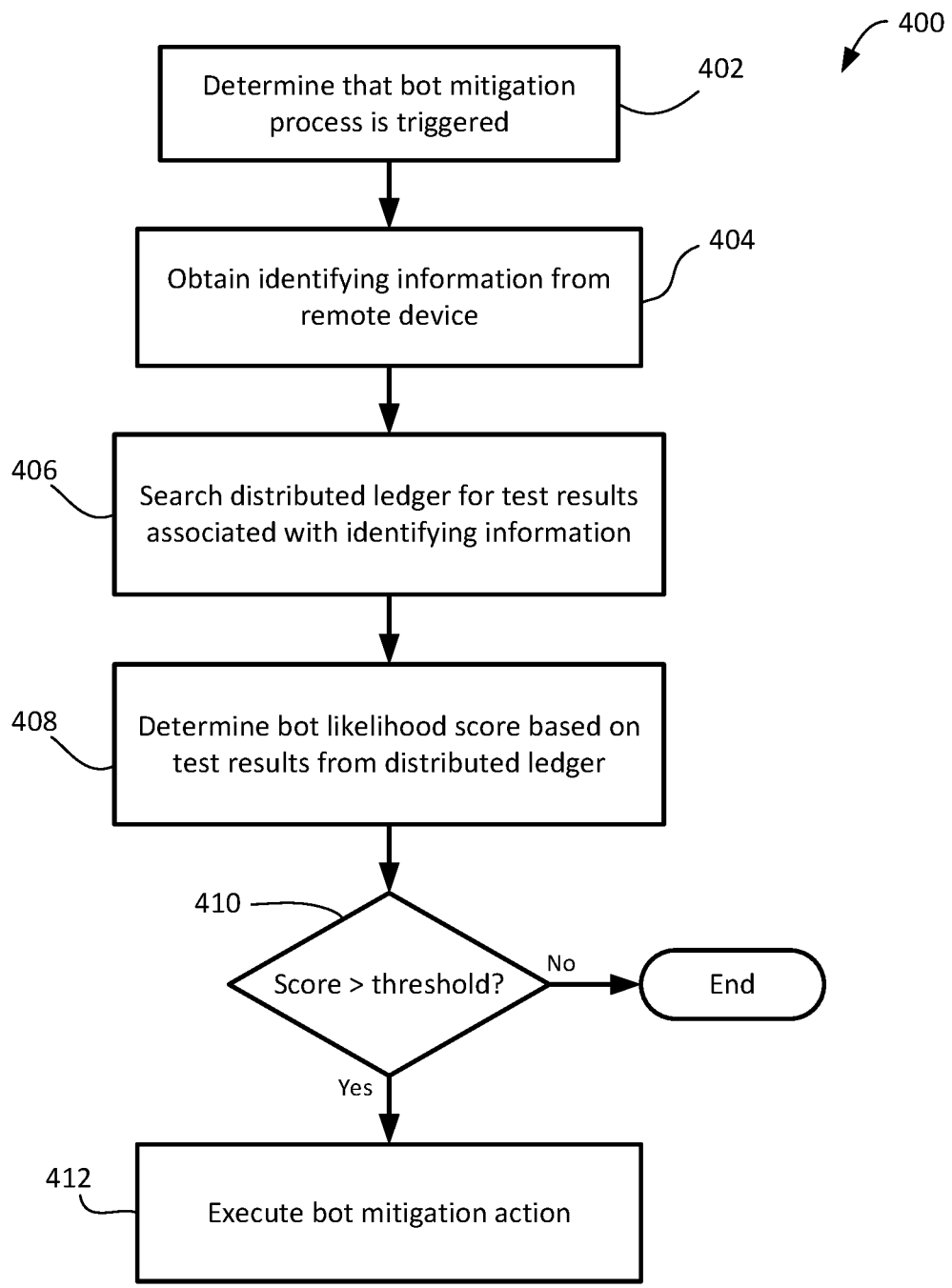
FIG. 4 shows, in flowchart form, an example method of bot mitigation employing test results recorded on a distributed ledger.

FIG. 4 will now be described. FIG. 4 shows, in flowchart form, an example method 400 for conducting bot mitigation based on prior test results. The method 400 may be carried out by a computing device and, in particular, a server that provides access to a service or resource accessible to remote user devices. The server may implement the method 400 as a part of its processes for reducing non-human-user load on the server, i.e. for identifying likely bots and taking mitigation actions. The server may include, for instance, a web server. In some cases, the server provides a bot mitigation service to other servers, such as web servers, that request bot mitigation processes from the server.

In operation 402, the server determines that the bot mitigation process has been triggered. In one example, this may be determined on the basis that the server, as a web server, receives a webpage request where that webpage includes coded therein a bot mitigation API call or the like. In another example, the determination may be based on receipt of an API call from another server. In some cases, the determination may be based on receipt of a user selection of a button or other UI element that is linked in the webpage code to triggering of the bot mitigation process.

The server obtains identifying information for the remote user device in operation 404. The identifying information be requested from the remote user device in response to the determination in operation 404 or independently therefrom. The identifying information may be obtained prior to determining that bot mitigation is to occur in some cases. As described above, the identifying information may include data identifying the remote device, the user of the remote device, or both.

In operation 406, the server searches or queries the distributed ledger, e.g. the blockchain, for test results based on the identifying information. In some cases, this may include transmitting a query message to a blockchain node. The query message may include some or all of the identifying information. The query message may further include search parameters, such as a time window or a test type requirement.

In response to the query message, the server receives a response message containing the results, if any, of the blockchain search. In some cases, if the identifying information cannot be found in any transactions on the blockchain then the response message may indicate the null results. Null results may indicate that no bot testing has occurred previously; in some instances the lack of test results may be indicative of a high likelihood of bot activity in circumstances in which test results would be expected to have been recorded if the remote user device had been following normal processes with the server. In cases where one or more transactions are located on the blockchain that contain the identifying information then some or all of the contents of those transactions may be received in the response message. The contents may include the test results data recorded in those transactions. The test results data may include a test type, test results, testing entity identifier, test timestamp, etc.

In operation 408, the server then determines a bot likelihood score based on the test results data. The determination of the bot likelihood score may use one or more test results. In the case where there are no previous test results, i.e. the response message contains a null result, the score may be indeterminate. In one example, the determination of the bot likelihood score may be based on the most recent test result. In another example, the score may be based on two or more of the most recent test results. The two or more results may be combined using a mathematical operation, such a AND or OR'ing the results if binary. The results may be combined by averaging the test results if non-binary. The results may be combined by weighted averaging in some cases. The weight attributable to a test result may be based on the type of test, the testing entity that administered the test, the test complexity or difficulty, the time of the test, or any combination thereof. The weight assigned to a test result may be zero in the case of some tests considered inaccurate, too old, or administered by an unknown entity. The test results included may be based on a time window of relevancy, e.g. the server may only include test results that have a timestamp within the last hour, or day, or week, etc.

In summary, the test results are filtered and combined to determine a bot likelihood score. The bot likelihood score may, in some cases, indicate the probability that the remote device/user is a human. In such an implementation, the higher the score is the more likely that the remote device/ user is human. The bot likelihood score may, in some cases, indicate the probability that the remote device/user is a bot. In such an implementation, the higher the score is the more likely that the remote device/user is a bot.

In operation 410, the server compares the bot likelihood score to a threshold level to determine whether the server can rely on the previous test results or whether the server should take further action. If the bot likelihood score is configured to be higher if the remote device is more likely a bot, then operation 410 includes determining whether the score exceeds a threshold and, if so, taking an action in operation 412. If the bot likelihood score is configured to be higher if the remote device is more likely a human, then operation 410 includes determining whether the score is below a threshold and, if so, taking an action in operation 412. In either case, if the server determines, based on the bot likelihood score, that the remote device is a suspected bot, then in operation 412 it takes a bot mitigation action.

The bot mitigation action may include imposing a further bot mitigation test, rather than just relying on previous test results. The further bot mitigation test may be selected based on it having an accuracy or complexity greater than the tests used in the previous test results. The bot mitigation action may include blocking the remote device from access to one or more services or resources. In some cases, the bot mitigation action may include imposing a delay time to slow activity of the remote device.

Figure 5:
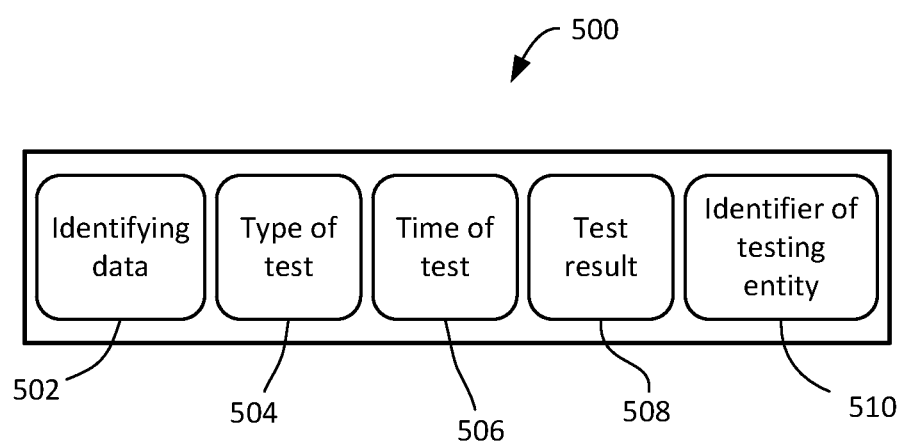
FIG. 5 diagrammatically illustrates an example record storing test results relating to bot mitigation.

FIG. 5 diagrammatically illustrates one example of a distributed ledger record 500 containing test results data. The record 500 may be a blockchain transaction in some instances. The record 500 may include a plurality of structured fields, such as header metadata fields relating to the transaction and/or its recordal on the blockchain, signature data, and the like. In structure fields may include one or more data fields in which the test results data may be recorded. The test results data may include identifying data 502 or information regarding the remote device or user that was subject to the bot mitigation test. The test results data may further include a type of test 504, a time of test 506, a test result 508, and an identifier for the testing service 510, in some implementations.

In one illustrative example, the server or platform providing a service or resource and employing bot mitigation may be an e-commerce platform that provides merchants with services to market products, receive orders, and process payment. In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions using a user computing device, and any associated payment requests, via the e-commerce platform, and the e-commerce platform may be equipped with transaction/ payment processing components or may delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

The e-commerce server or platform may employ a number of external services or resource provided by external servers in the context of enabling a retail transaction, such as payment processors, fraud detection services, shipping services, etc. Those external servers may each employ some type of bot mitigation process in addition to the one or more bot mitigation processes that may be applied by the e-commerce server or platform.

Bot mitigation in the context of e-commerce servers may be particularly important in the case of high-demand events, such as flash sales or product launch events. Consider, for example, the sale of concert tickets, limited edition items, etc. Outside of e-commerce other situations may involve low-supply, high-demand events, such as online booking of activities or registration for limited access events, such as vaccine appointments, interview slots, or other such events.

When managing a low-supply high-demand event and regulating online access to the event, a server may employ a queue in which requests for access or pre-registration are accepted and users/remote devices are then placed in a virtual waiting room or queue for access once the event is made available. The queue may be an ordered queue with each user/remote device in one position. In some cases, the queue may be a "bucketed queue", in which users are allocated to a current "bucket" having a certain number of unordered users/remote devices in each bucket, and wherein each bucket is granted access to the event in a sequential order. That is, buckets are "released" in order, but the users in each bucket are unordered.

Bot mitigation may be applied at the queueing stage to minimize or reduce the likelihood of placing bots in the queue, or to limit the scale at which bots are able to enter the queue.

Figure 6:
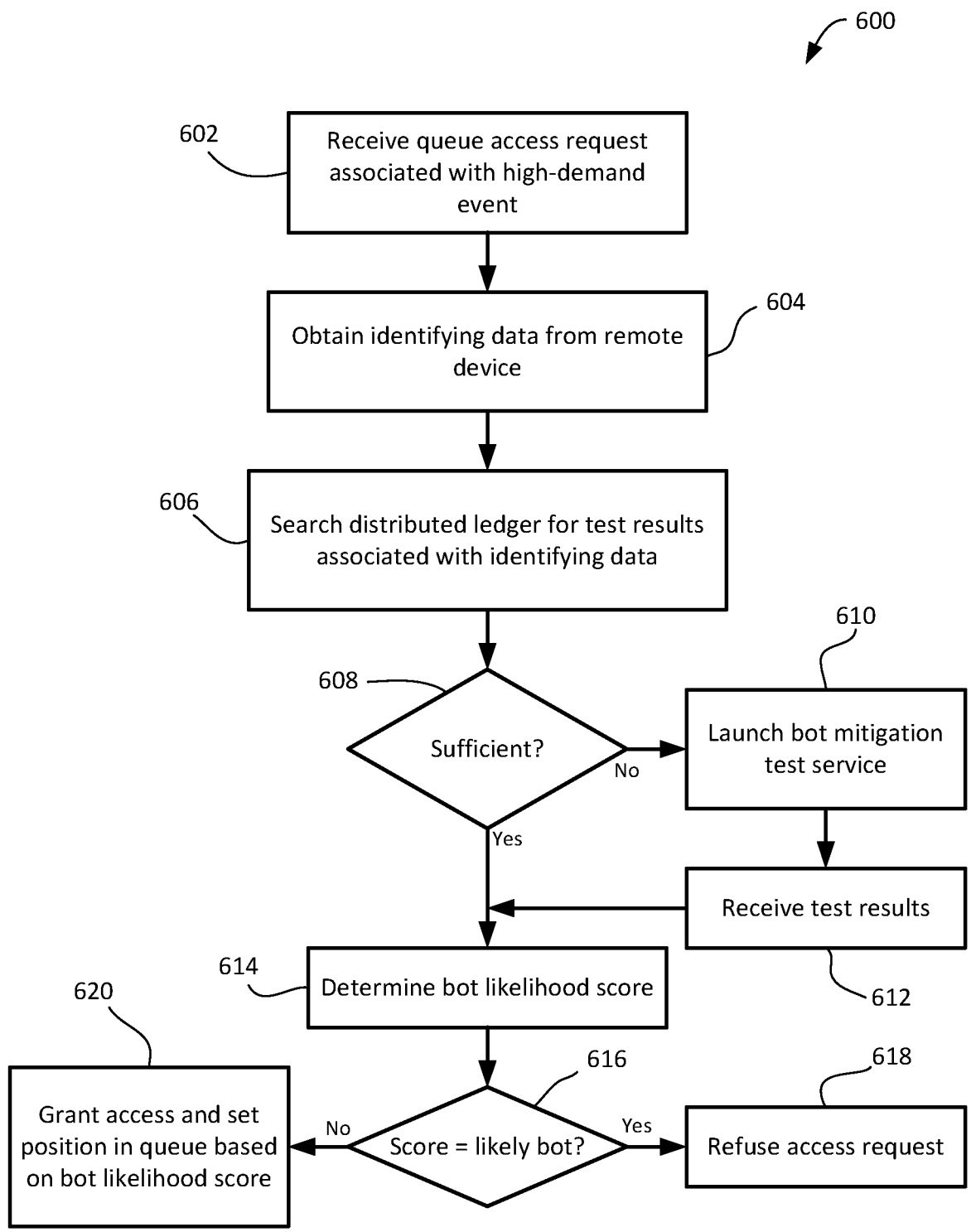
FIG. 6 shows, in flowchart form, an example method of queue management for high-demand online events using bot mitigation testing.

Reference is now made to FIG. 6, which shows, in flowchart form, one example method 600 of mitigating bot access to a queue for a high demand event. The method 600 may be implemented by a computing device, such as a server. The method 600 may be implemented by way of processor-readable instructions stored in memory at the server. The processor-readable instructions, when executed by one or more processors, may cause the one or more processors to carry out the described operations. The server may be one or more server and may be configured to implement an e-commerce platform in some examples. The e-commerce platform may apply the method 600 in the management of a high demand event such as a new product launch or flash sale.

In operation 602, the server receives a request for access to a queue for the flash sale or other high demand event. The request for access may include a request to view a product item information page, selection of a buy button, or some other user input via a remote device indicating an interest in purchasing the product item.

The server may obtain identifying data in operation 604. The server may obtain the identifying data prior to operation 602 or in response to operation 602. The identifying data is obtained from the remote device and it may include information identifying the device or identifying the user, as described above.

The server may then, in operation 606, search the distributed ledger for records associated with the remote device. The search may be for records containing some or all of the identifying data.

In operation 608, the server may determine whether the search results are sufficient. In some implementations, any results other than NULL may be considered sufficient. In some implementations, the results may be considered sufficiently only if there is a test result within a recent window of time, or if there is a test result that is of at least a certain level of complexity or difficulty, or if there is a test result from a trusted testing entity. Other measures of sufficiency may be applied, including combinations of the foregoing.

If the test results obtained from the distributed ledger are insufficient, then in operation 610 the server may apply its own bot mitigation test. The bot mitigation test may be a bot mitigation testing process implemented at the server or may be a bot mitigation service provided by an external source. The results of that test are received in operation 612. The results of the current bot mitigation test may be the only test result or may be combined with test results obtained from the distributed ledger in some cases.

In operation 614, if the results from the distributed ledger were determined to be sufficient in operation 608, or if they were insufficient and a new bot mitigation test was conducted, then the server now determines a bot likelihood score for the remote device. If the test results from the distributed ledger were sufficient, then the bot likelihood score may be entirely based on the previous test results. If the test results from the distributed ledger were not sufficient, then the bot likelihood score may be entirely based on the new bot mitigation test conducted in operation 610, or may be a combination of the test results from the new bot mitigation test and the old test results from the distributed ledger. As discussed above, the bot likelihood score may be determined through a weighted combination of two or more of the test results.

In operation 616, the server compares the bot likelihood score to a threshold. In this example, the bot likelihood score indicates the probability that the remote device is human operated. Accordingly, a higher score indicates that the remote device is more likely human operated. As such, the threshold in this example is a minimum threshold. Operation 616 in this example determines whether the bot likelihood score exceeds the minimum threshold. If so, then the remote device is considered sufficiently likely to be human operated. If not, then it is considered to be a likely bot. If the score is less than the minimum threshold, then in operation 618 the remote device may be refused access to the queue. An error message or other communication may be sent to the remote device in some implementations. In some cases, further testing may be applied instead of outright refusal of access.

If the score meets the minimum threshold, then in operation 620 the remote device is granted access to the queue. In some implementations, the remote device may be given a queue position based on the bot likelihood score. That is, the remote devices with the highest score, e.g. those least likely to be a bot, may be given higher positions in the queue, thereby granting them earlier or preferential access to the event when available. In some implementations, the queue may include multiple containers or buckets and may be structured to provide staged access to the event. The bucket or container into which a remote device is allocated may be based on the bot likelihood score. In some cases, the queue may be partitioned into two or more buckets. For example, buckets may be designated based on probability ranges corresponding to assessments of bot likelihood, such as "not a bot", "probably not a bot", "might be a bot". The bucket divisions may be reflective of different levels of non-bot probability or confidence (e.g. >99%, 99%>95%, 95%>80%, etc.), and the remote device may be placed into the queue bucket corresponding to the bot likelihood score determined from the test results on the ledger. The "buckets" of users in the queue may be given staged access to the flash sale in some cases so as to prioritize devices that have the strongest non-bot probability.

Advantageously, by having servers rely on recorded test results on the distributed ledger, repeated applications or duplications of bot mitigation processes may be avoided, particularly in the case where multiple servers or services are being provided in connection with one remote device session or interaction with a web server or application server. Secondary servers or services that are employed by the web server or application server may determine whether further bot mitigation action is needed by determining a bot mitigation score from the test results relating to the remote device that are recorded on the distributed ledger.

The above-described methods are illustrative simplified example processes. It will be appreciated that some of the described operations may be performed in a different order or in parallel, or that additional operations may be carried out, without departing or deviating from the overall thrust of the methods and their functional operation.

Although implementation on an e-commerce platform, as such, is not required, it may be illustrative to provide further details regarding the components and operations of one or more example e-commerce platforms.

An Example e-Commerce Platform

Figure 7:
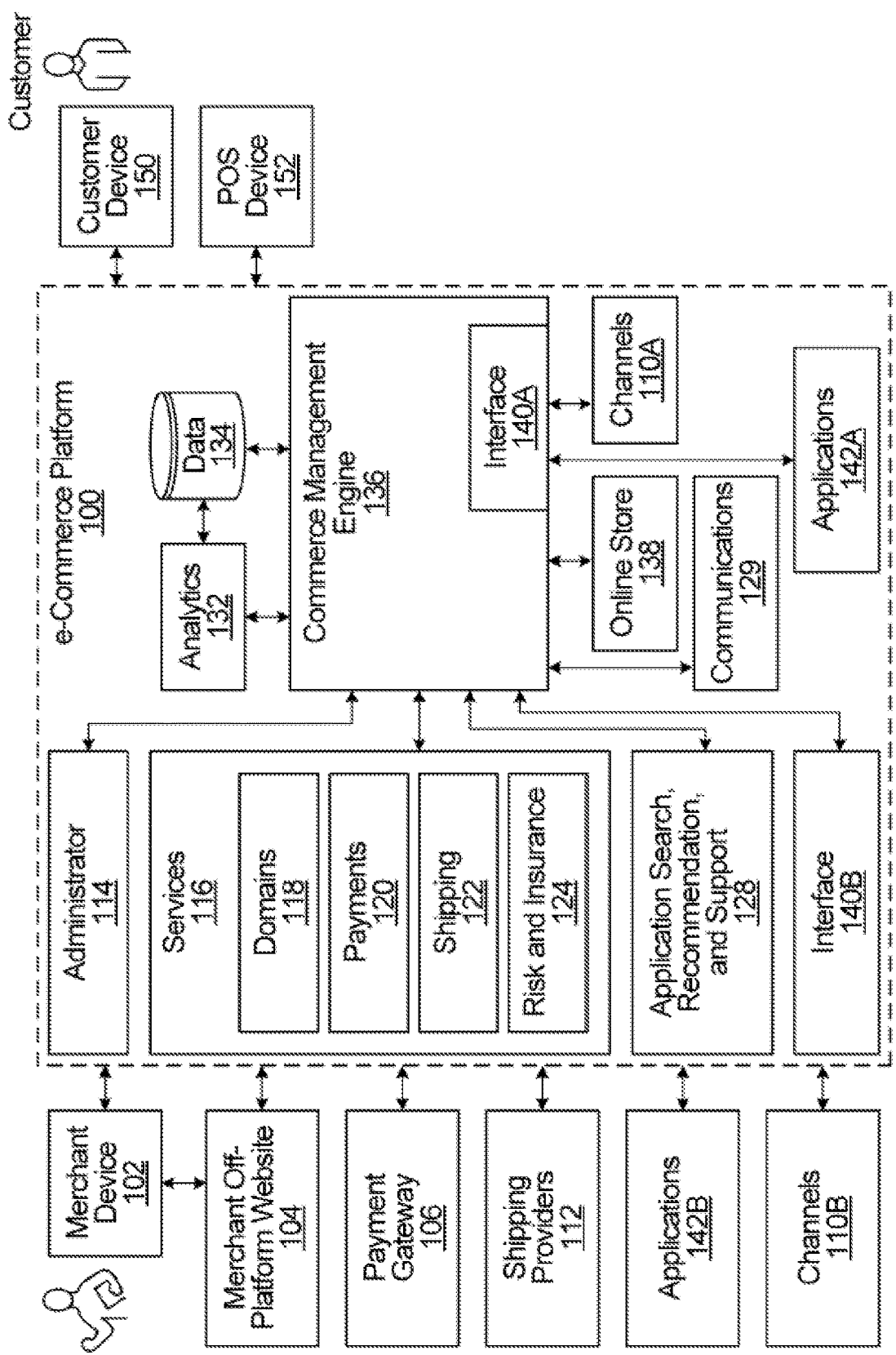
FIG. 7 is a block diagram of an e-commerce platform, according to an example embodiment.

FIG. 7 illustrates the example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data repository 134) such as, for example, through a network connected to the e-commerce platform 100. For example, the online store 138 may serve or send content in response to requests for data from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., in data repository 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfilment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfilment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfilment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfilment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfilment component of the commerce management engine 136. The fulfilment component may group the line items of the order into a logical fulfilment unit of work based on an inventory location and fulfilment service. The merchant may review, adjust the unit of work, and trigger the relevant fulfilment services, such as through a manual fulfilment service (e.g., at merchant managed locations) used when the merchant picks and packs the products in a box, purchase a shipping label and input its tracking number, or just mark the item as fulfilled. Alternatively, an API fulfilment service may trigger a third-party application or service to create a fulfilment record for a third-party fulfilment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks.

Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
   detecting a trigger for bot mitigation in association with a remote device;
   obtaining identifying data regarding the remote device;
   searching a blockchain using the identifying data to locate one or more bot mitigation test results stored in records on the blockchain containing the identifying data, the one or more bot mitigation test results indicating whether the remote device is suspected to be a bot or not a bot, the one or more bot mitigation test results including one or more bot mitigation test results from third-party services and including data based on a quantitative measure of complexity of the one or more bot mitigation test results;
   determining a bot likelihood score based on the one or more bot mitigation test results indicating whether the remote device is suspected to be a bot or not a bot and on the data based on the quantitative measure of complexity of the one or more bot mitigation test results; and
   comparing the bot likelihood score to a threshold and, in response to the comparison, executing a mitigation action.

2. The method of claim 1, wherein the bot mitigation test results comprise two or more bot mitigation test results, and wherein determining the bot likelihood score includes filtering or weighting the two or more bot mitigation test results based on the data regarding the quantitative measure of complexity of the two or more bot mitigation tests results.

3. The method of claim 2, wherein the two or more bot mitigation test results are further associated with respective times of test, and wherein determining the bot likelihood score includes filtering or weighting the two or more bot mitigation test results based on the times of test.

4. The method of claim 1, wherein the bot mitigation test results are further associated with respective testing entity identifiers, and wherein determining the bot likelihood score is at least partly based on the respective testing entity identifiers.

5. The method of claim 1, wherein the mitigation action includes executing a bot mitigation test.

6. The method of claim 1, wherein the identifying data includes one or more of a user identifier, an account identifier, or a device identifier.

7. The method of claim 1, wherein the detecting the trigger includes detecting a user input from the remote device in connection with a webpage element.

8. The method of claim 1, wherein searching includes searching the blockchain for transactions containing the identifying data.

9. The method of claim 1, wherein the trigger includes receiving a request for access to a flash sale.

10. The method of claim 9, wherein the mitigation action includes allocating the remote device to a secondary tier in a queue for the flash sale.

11. The method of claim 9, wherein the mitigation action includes blocking the remote device from the flash sale.

12. The method of claim 9, wherein the mitigation action includes allocating the remote device a position in a queue based on its bot mitigation score relative to bot mitigation scores of other devices in the queue.

13. A computing system, comprising:
    a processor;
    a memory storing computer-executable instructions that, when executed by the processor, are to cause the processor to:
        detect a trigger for bot mitigation in association with a remote device;
        obtain identifying data regarding the remote device;
        search a blockchain using the identifying data to locate one or more bot mitigation test results stored in records on the blockchain containing the identifying data, the one or more bot mitigation test results indicating whether the remote device is suspected to be a bot or not a bot, the one or more bot mitigation test results including one or more bot mitigation test results from third-party services and including data based on a quantitative measure of complexity of the one or more bot mitigation test results;
        determine a bot likelihood score based on the one or more bot mitigation test results indicating whether the remote device is suspected to be a bot or not a bot and on the data based on the quantitative measure of complexity of the one or more bot mitigation test results; and
        compare the bot likelihood score to a threshold and, in response to the comparison, execute a mitigation action.

14. The computing system of claim 13, wherein the bot mitigation test results comprise two or more bot mitigation test results, and wherein the instructions, when executed, are to cause the processor to determine the bot likelihood score by filtering or weighting the bot mitigation test results based on the data regarding the quantitative measure of complexity of the two or more bot mitigation tests results.

15. The computing system of claim 13, wherein the bot mitigation test results are further associated with respective testing entity identifiers, and wherein the instructions, when executed, are to cause the processor to determine the bot likelihood score at least partly based on the respective testing entity identifiers.

16. The computing system of claim 13, wherein the mitigation action includes executing a bot mitigation test.

17. The computing system of claim 13, wherein the instructions, when executed, are to cause the processor to detect the trigger by detecting a user input from the remote device in connection with a webpage element.

18. The computing system of claim 13, wherein the instructions, when executed, are to cause the processor to search the blockchain for transactions containing the identifying data.

19. The computing system of claim 13, wherein the trigger includes receiving a request for access to a flash sale, and the mitigation action includes allocating the remote device to a secondary tier in a queue for the flash sale.

20. The computing system of claim 13, wherein the trigger includes receiving a request for access to a flash sale, and wherein the mitigation action includes allocating the remote device a position in a queue based on its bot mitigation score relative to bot mitigation scores of other devices in the queue.

21. A non-transitory, computer-readable medium storing computer-executable instructions that, when executed by a processor, are to cause the processor to:
    detect a trigger for bot mitigation in association with a remote device;
    obtain identifying data regarding the remote device;
    search a blockchain using the identifying data to locate one or more bot mitigation test results stored in records on the blockchain containing the identifying data, the one or more bot mitigation test results indicating whether the remote device is suspected to be a bot or not a bot, the one or more bot mitigation test results including one or more bot mitigation test results from third-party services and including data based on a quantitative measure of complexity of the one or more bot mitigation test results;

determine a bot likelihood score based on the one or more bot mitigation test results indicating whether the remote device is suspected to be a bot or not a bot and on the data based on the quantitative measure of complexity of the one or more bot mitigation test results; and compare the bot likelihood score to a threshold and, in response to the comparison, execute a mitigation action.

* * * * *